340-870.11 SR
OR 2,640,973
X7062E
X70477
X70487
SEARCH ROOM

June 2, 1953 R. F. CLEAVER ET AL 2,640,973

ELECTRIC SIGNAL MODULATOR

Filed Jan. 5, 1949 2 Sheets-Sheet 1

Inventors
RICHARD FRANCES CLEAVER
THOMAS DUNCAN GRAY
By R. F. Morris
Attorney

ELECTRIC SIGNAL MODULATOR

Filed Jan. 5, 1949 2 Sheets-Sheet 2

Inventors
RICHARD FRANCES CLEAVER
THOMAS DUNCAN GRAY
By R P Morris
Attorney

Patented June 2, 1953 2,640,973

UNITED STATES PATENT OFFICE 2,640,973

ELECTRIC SIGNAL MODULATOR

Richard Francis Cleaver and Thomas Duncan Gray, London, England, assignors to International Standard Electric Corporation, New York, N. Y., a corporation of Delaware Application January 5, 1949, Serial No. 69,352
In Great Britain January 6, 1948

2 Claims. (Cl. 340—182)

The present invention relates to electric carrier wave modulating arrangements.

The principal object of the invention is to improve the linearity of the relation between the amplitude of the modulating signal wave and the corresponding amplitude of the modulated carrier wave.

The invention will be illustrated by an application to a direction finding system for aircraft or other moving vehicles, but is not limited to this particular application. The invention is of particular interest in cases where the variations of the modulating signal take place at very low frequencies, or where the signal comprises merely a fixed voltage, or one which changes very slowly.

British patent specifications Nos. 590,260 and 590,261 describe arrangements intended for use with a radio direction finding system in which the direction of an aircraft or other vehicle or object is specified by two pairs of co-ordinate potentials, which may be fixed or may vary slowly. Specification No. 590,260 describes an arrangement by means of which each pair of co-ordinate voltages is converted into a pair of periodic waves of exponential form which are used to provide corresponding co-ordinate deflection of the electron beam of a cathode ray tube, so that a line trace is produced on the screen, the direction of which indicates the direction of the vehicle. As it is sometimes necessary to repeat the indications on another cathode ray tube situated at a distance, a special transmitting arrangement is required, and such an arrangement is described in specification No. 590,261. However, this arrangement is practically limited to a distance of a few thousand yards, and moreover required four cable circuits of rather special type for transmission of the four periodic waves corresponding to the four deflecting plates of the cathode ray tube.

When it is desired to repeat the indication over distances which may be more than a very few miles, it is desirable to employ not more than one commercial signal channel, which may be a radio or other carrier wave channel or a voice frequency circuit over wires. Since the indications correspond with signals of very low or zero frequency, it is necessary to modulate a carrier wave suitable for transmission over the channel to be used.

An essential requirement for this is that there should be an accurately linear relation between the modulating voltage and the amplitude of the resulting modulated carrier wave, in order that errors shall not be introduced into the repeated indications. The modulating arrangement of the present invention is designed to fulfil this stringent requirement, and such an arrangement also provides a modulator for other purposes, in which it may be desired to reduce the signal distortion introduced by the modulation process to negligible proportions.

The above stated principal object of the invention is achieved by providing an arrangement for generating modulated electric carrier waves, comprising means for including a commutating device for generating complex periodic waves having a given frequency and having amplitude proportional to the amplitude of a modulating signal wave and means for selecting a harmonic component of the said periodic waves to serve as the said modulated electric carrier waves.

The invention will be described with reference to the accompanying drawings in which—

Figure 1:
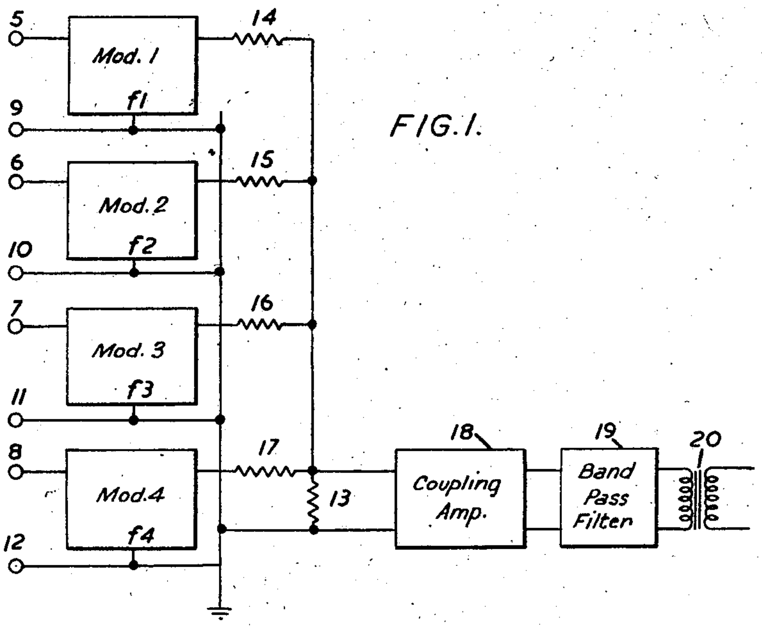
Fig. 1 shows a block schematic circuit diagram of a transmitter for the four indicating voltages of a direction finding system of the kind already mentioned, including modulating arrangements according to the invention.

Referring to Fig. 1, the transmitter comprises four modulators, 1, 2, 3, 4 which are similar except that each of them produces a modulated carrier wave of frequency different from that of any of the other. The co-ordinate voltages which are to be transmitted are applied in positive sense respectively at terminals 5, 6, 7 and 8. Terminals 9, 10, 11 and 12 are the corresponding earth terminals. The waves produced by the modulators are mixed together in a shunt resistance 13, through isolating resistances 14, 15, 16 and 17. The resistance 13 should be small compared with the other resistances, for example about 100 times smaller.

The mixed waves appearing across the resistance 13 are applied to a coupling amplifier 18, the output of which is connected through a band pass filter 19 and an optional transformer 20 to the channel over which the indications are to be transmitted.

Figure 2:
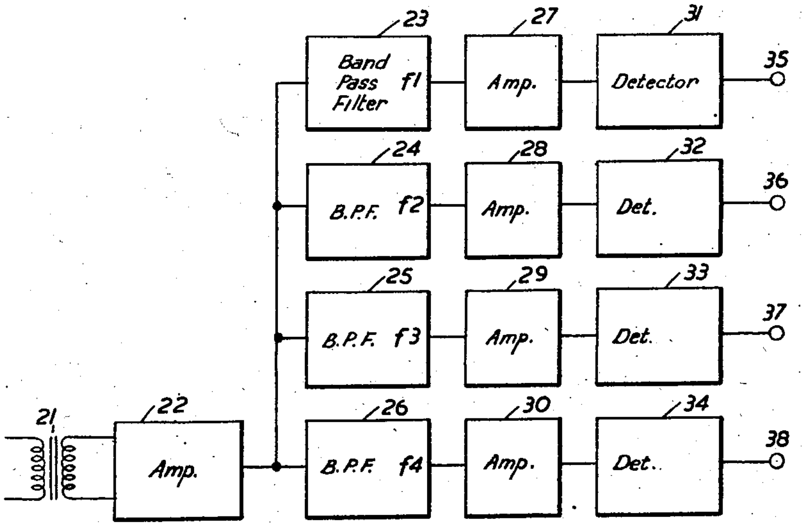
Fig. 2 shows a block schematic circuit diagram of the corresponding receiving arrangement.

Referring now to Fig. 2, the receiving end of the channel is connected through an optional transformer 21 to a suitable amplifier 22, which may be provided with automatic gain control, and whose output is connected to four separating band pass filters 23, 24, 25, 26 which respectively select the modulated carrier waves corresponding to the four co-ordinate voltages. These filters are connected to stable amplifiers 27, 28, 29 and 30 and thence to detectors 31, 32, 33 and 34 which derive from the modulated carrier waves voltages which are proportional to the original modulating co-ordinate voltages, which are obtained from the output terminals 35, 36, 37, and 38 to which may be connected the circuit (not shown) for controlling the deflection of the electron beam of the oscillograph.

The four amplifiers should each preferably be provided with a large amount of negative feed back in order that the gain may be accurately known and stable, and may be designed in any conventional manner.

The detectors may also be of any suitable type, but should preferably be of the kind employing diodes. The use of rectifiers responsive to the arithmetic mean, that is to the "area" under the signal wave rather than to the peak amplitude reduces the harmful effect of cross talk.

It is desirable that the carrier frequencies $f1$, $f2$, $f3$, and $f4$ used for conveying the co-ordinate voltages should be fairly close together in order to minimise the differences in attenuation which the waves suffer by transmission over the line, which differences should in any case be compensated by known means. The higher frequencies should also be well separated from any harmonics of the lower frequencies otherwise errors may be introduced into the repeated voltages by interference.

The highest frequency ($f4$) should therefore preferably be substantially lower than twice the lowest frequency ($f1$).

Fairly close frequency spacings is desirable to minimize the effects of changes in the transmission frequency characteristic of the channel. However, the difference between adjacent frequencies should preferably not be so small that elaborate filtering is necessary to separate them. A reasonable compromise would be to use four frequencies spaced about 100 cycles per second apart near the middle or upper part of the commercial speech frequency band. For example, frequencies of 900, 1020, 1140, and 1260 cycles per second might be used for $f1$ to $f4$, respectively which are frequencies commonly employed for voice frequency telegraph systems, and for which commercial filters are likely to be easily obtainable.

Figure 3:
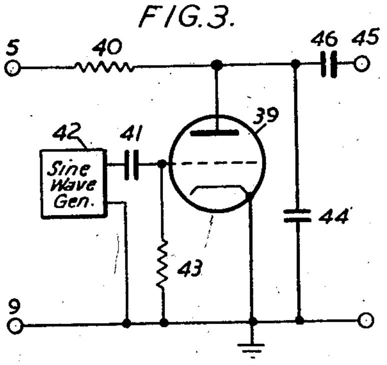
Figs. 3 and 4 show details of two forms of the modulator.

The details of the modulator 1 shown in Fig. 1 are shown in Figs. 3. This circuit is substantially the same as one of the switching circuits described in specification No. 590,260. It comprises a valve 39, the anode of which is connected through a high resistance 40 to the input terminal 5 to which the corresponding coordinate voltage is applied. The cathode of the valve 39 is connected directly to ground and the control grid is connected through a blocking condenser 41 to a sine wave generator 42 generating waves of large amplitude at the frequency $f1$. The control grid is grounded through a resistance 43, and the anode is connected to ground through a reservoir condenser 44 and to an output terminal 45 through a blocking condenser 46.

The resistance 43 in conjunction with the condenser 41 provides a negative bias for the control grid which should be such that the valve is blocked except for short periods at the positive crests of the applied sine wave. The condenser 44 charges up exponentially through the resistance 40 towards the co-ordinate voltage applied to terminal 5, during the blocked periods of the valve, and is discharged very rapidly almost to zero potential through the valve when it is unblocked at each positive crest of the applied sine wave. It will be evident that saw tooth waves of exponential form will be generated at the terminals of the condenser 44 and may be obtained from terminal 45. The amplitude of these waves is a function of the co-ordinate voltage applied at terminal 5, the time constant of elements 40 and 44, and the frequency of the waves from generator 42. The shape and amplitude of the waves is practically independent of the characteristics of the valve 39, so long as the unblocking period is very short. If the fundamental sine wave component of the saw tooth waves is selected, its amplitude will clearly be proportional to the applied co-ordinate voltage; in other words, a carrier wave of frequency $f$, is thus obtained, modulated in accordance with the co-ordinate voltage. Similarly, by selecting the $n$th harmonic a modulated carrier wave of frequency $nf$ will be obtained. As usual, the fundamental will be regarded as the first harmonic component of the saw tooth waves.

Figure 4:
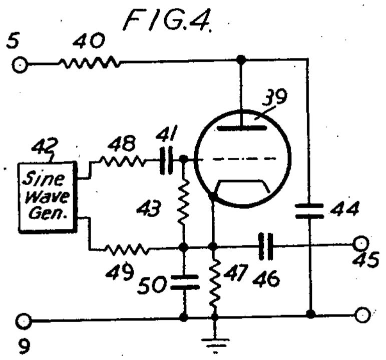

A slightly different form of the modulator is shown in Fig. 4. In Fig. 3, the output exponential saw tooth waves are developed in high impedance, while in Fig. 4 they are developed in a low impedance. Fig. 4 differs in that the cathode of the valve 39 is connected to ground through a resistance 47, and the output terminal 45 is connected through the blocking condenser 46. Furthermore, the generator 42 is connected in balanced manner through equal resistances 48 and 49 between the condenser 41 and the cathode of the valve. The output exponential waves are in this case produced during the discharge period of the condenser 44 instead of during the charge period.

The balanced connection of the generator 42 is used in order substantially to prevent the direct appearance of the waves from this generator across the load resistance 47, from which they would be fed on to the line, which is not desired.

The time constant of elements 41 and 43 should be relatively large, as before, so that a blocking bias is generated of such magnitude that the valve 39 conducts only for a period at the crests of the applied sine wave. During the blocking periods the condenser 44 charges up to a potential substantially equal to that applied to terminal 5, and will be discharged through the valve 39 and resistance 47.

Figure 7:
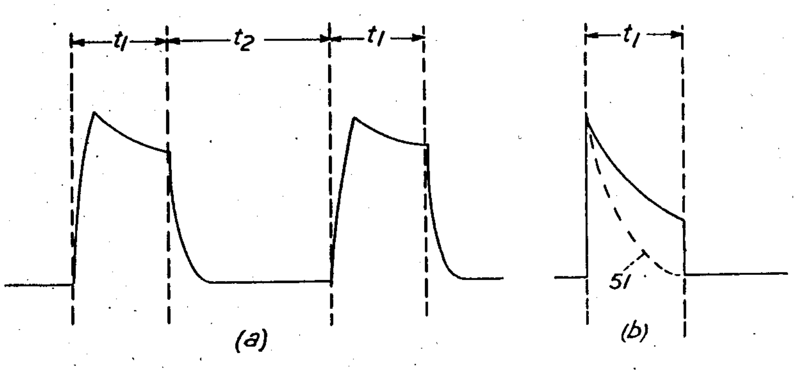
Fig. 7 shows graphical diagrams used to explain the operation of the modulator illustrated in Fig. 4.

A condenser 50 is shown shunting the resistance 47. This condenser is intended to represent the stray capacity shunting this resistance, or an actual element intentionally added. Fig. 7, curve ($a$) shows two of the waves of potential at the terminals of the resistance 47 which occur during the conducting periods $t1$ of the valve.

These waves are like pulses with exponential leading and trailing edges, and exponential crests, and the two pulses shown are separated by the blocking period $t2$ of the valve. The exponential curves may be varied by adjusting the time constant of the circuits associated with the resistance 47.

In particular, by removing the condenser 50 and reducing the corresponding stray capacity substantially to zero, a pulse or wave similar to ($b$), Fig. 7 may be obtained. If the time constant of the condenser 44 and the sum of the resistance of the valve when conducting, and the resistance 47, be sufficiently reduced and/or the conducting time $t1$ be increased, the shape of the pulse can be made to approach that indicated by the dotted line 51, Fig. 7 (b).

It should be noted that if the stray capacity cannot be reduced to negligible proportions, it would be desirable to employ a sufficiently large condenser 50 in order that variations in the stray capacity may be rendered ineffective.

It will be understood that all the modulators shown in Fig. 1 may be similar to Fig. 3 or Fig. 4, and will differ only in the frequency chosen for the generator 42.

Figure 5:
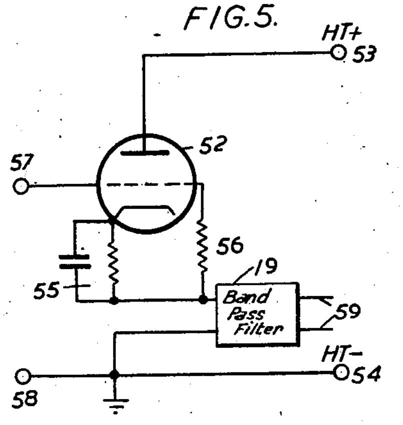
Figs. 5 and 6 show details of two forms of coupling circuit for the four modulators.

One form of the coupling amplifier 18 (Fig. 1), together with the filter 19 is shown in Fig. 5. This comprises a valve 52 arranged as a cathode follower with its anode connected directly to the positive high tension terminal 53, the corresponding negative terminal 54 being connected to ground. The cathode of the valve 52 is connected to ground through a cathode bias network 55 in series with the input circuit of the band pass filter 19. The usual grid leak resistance is shown at 56. An input terminal 57 is connected to the control grid, the corresponding grounded terminal being 58. Terminals 57 and 58 will be connected across resistance 13 (Fig. 1) and the output terminals 59 of the filter 19 will be connected to the transformer 20 (Fig. 1).

Figure 6:
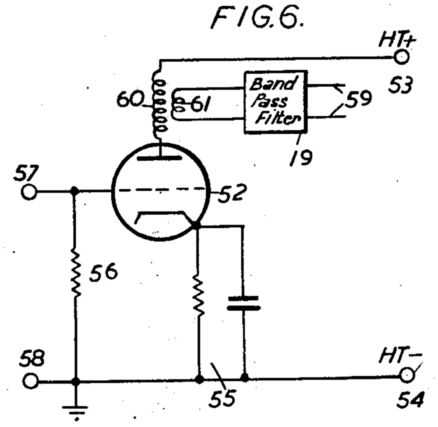

An alternative form of the coupling amplifier is shown in Fig. 6 in which the valve is operated as an ordinary amplifier. The anode is connected through the primary winding of an output transformer 60 to terminal 53, and the filter 19 is connected to the secondary winding of 61, the elements 55 and 56 being connected directly to ground. Either form of coupling circuit may be used with either form of modulator.

The mixing arrangement comprising the resistances 13 to 17 in Fig. 1 should be designed to reduce the maximum voltage applied to the telephone line to a reasonable value such as ½ volt R. M. S.

In the case of the direction finder system already referred to, the voltages applied to terminals 5 to 8 are of the order 200±150 volts. The combined effect of converting these voltages into exponential waves and then selecting the fundamental component reduced the voltage available at terminals 59 of Fig. 5 (assuming the arrangements of Figs. 3 and 5 are used) to about 50±37 volts R. M. S. This means that the resistances 14 to 17 should each be something like 100 times the resistance 13. Preferably also the resistance 14 of Fig. 1 should be large compared with the corresponding resistance 40 of Fig. 3.

It should be noted also that by making the resistance 13 small compared with the other resistance, interaction between the modulators through the mixing network is reduced to negligible proportions.

The mixing may also be done with a capacity arrangement in which the condenser 44 (Fig. 3) of each modulator is connected to ground through a mixing condenser (not shown) common to all the modulators. The capacity of the mixing condenser should be, say 100 times that of any of the condensers 44, and the coupling amplifier 18 (Fig. 1) is connected across the mixing condenser, the resistances 13 to 17 being of course omitted.

As already explained, the exponential waves or pulses produced by the modulators are passed through the band pass filter 19 which removes all but the fundamental frequency in each case. These fundamental frequency waves will be amplitude modulated in accordance with the signal voltages applied to the modulators. The filter 19 is not absolutely essential, and could be omitted, but it is desirable for the purpose of avoiding unnecessary noise or cross talk in the telephone circuit. In any case, if the filter 19 should be omitted, the harmonics will be removed at the receiver by the corresponding band pass filters 23 to 26.

Investigations have shown that the amplitude of the waves obtained at the output of the filter 19 (Fig. 1) for given modulating voltage applied to one of the modulators is practically independent of the amplitude of the switching waves derived from the generator 42, and also, within relatively wide limits of the time constant of the elements 40 and 44 provided that this is essentially chosen for the frequency concerned. Thus in this case the amplitude of the modulated carrier waves will be independent of variations of these parameters.

The effect of this time constant may be understood from the following considerations. When the time constant is very short, the output saw tooth waves are of large amplitude but exponential edges are steep so that the relative amplitude of the fundamental component is small. As the time constant increases, the amplitude of the waves decreases, but the relative amplitude of the fundamental increases. At some moderate value of the time constant the amplitude of the waves is decreasing at about the same rate as the relative amplitude of the fundamental is increasing so the actual amplitude of the selected fundamental component then remains practically constant. Thus if the time constant is chosen at this moderate value the actual amplitude of the fundamental will be substantially independent of variations in this time constant so the values of the elements 40 and 44 are not at all critical.

It has already been stated that the invention is not restricted to transmitting to a distance the deflecting voltages for a cathode ray tube of a radio direction finding system. Various types of modulating signal wave may be applied to terminal 5 of the modulator shown in Fig. 3 or 4, the generator 42 may be given some suitable frequency, considerably higher than any signal frequency. The arrangements described with reference to Figs. 1 and 2 could obviously be used to provide four telegraph channels, and additional modulators could be added if more channels are required. In such a case, it would probably be desirable to connect a suitable band pass filter directly after each modulator, each of which filters is adapted to pass the band corresponding to the channel concerned, the filter 19 being then unnecessary. By suitably raising the frequencies of the generators 42 of the various modulators, a multichannel carrier current speech communication system becomes at once available.

It may be added that the generators 42 could produce regularly repeated rectangular switching pulses of appropriate duration instead of sine waves, the duration being chosen to be equal to the period during which the valve 39 is to be unblocked.

It will be understood that the arrangements which have been described may be modified in various ways. For example, the valves 39 of Figs. 3 and 4, which are acting as electronic switches or commutating devices may be replaced by the other types of electronic or mechanical commutating devices adapted periodically to charge or discharge a condenser such as 44.

The exponential saw tooth waves or pulses may also be generated by means of any of the circuits described in specification No. 590,260. Furthermore, the complex waves generated by the commutating device under the control of the signal voltage could be of other forms besides exponential saw tooth waves or pulses, from which a suitable harmonic is selected to serve as the signal modulator carrier wave.

We claim:

1. An arrangement for generating carrier sine waves, amplitude-modulated in accordance with signal voltages; comprising means for producing a train of direct current pulses having a given polarity and repetition frequency, means for applying the signal voltages to said pulse producing means to modulate the amplitude of said direct current pulses in accordance with said signals, and means for selecting a harmonic component of said resultant amplitude-modulated pulse train to serve as the said amplitude-modulated carrier sine wave.

2. An arrangement for generating carrier sine waves, amplitude-modulated in accordance with signal voltages; comprising means for producing a train of pulses having exponentially varying components and a given repetition frequency, means for applying the signal voltage to said pulse producing means to modulate the amplitude of said pulses in accordance with said signals, and means for selecting a harmonic component of said resultant amplitude-modulated pulse train to serve as the said amplitude-modulated carrier sine wave.

RICHARD FRANCIS CLEAVER.
THOMAS DUNCAN GRAY.

References Cited in the file of this patent

UNITED STATES PATENTS

| Number | Name | Date |
|---|---|---|
| 1,633,100 | Heising | June 21, 1927 |
| 2,063,610 | Linsell | Dec. 8, 1936 |
| 2,077,196 | Alexanderson | Apr. 13, 1937 |
| 2,378,395 | Dickson et al. | June 19, 1945 |
| 2,412,350 | Morgan | Dec. 10, 1946 |
| 2,426,778 | Long | Sept. 2, 1947 |
| 2,433,343 | Chatterjea et al. | Dec. 10, 1947 |
| 2,434,057 | Sproule | Jan. 6, 1948 |
| 2,436,663 | Norgaard | Feb. 24, 1948 |
| 2,441,246 | Miller | May 11, 1948 |
| 2,494,370 | Swartzel | Jan. 10, 1950 |